United States Patent [19]

Hatano et al.

[11] 4,330,473
[45] May 18, 1982

[54] RECORDING MATERIAL

[75] Inventors: Yoshihiro Hatano, Osaka; Kenji Yamamoto, Yao, both of Japan

[73] Assignee: Yamamoto Kagaku Gosei Kabushiki Kaisha, Osaka, Japan

[21] Appl. No.: 210,867

[22] Filed: Nov. 26, 1980

Related U.S. Application Data

[63] Continuation-in-part of Ser. No. 783,475, Mar. 31, 1977, abandoned, which is a continuation-in-part of Ser. No. 529,126, Dec. 3, 1974, abandoned, which is a continuation-in-part of Ser. No. 295,580, Oct. 6, 1972, abandoned, which is a continuation-in-part of Ser. No. 123,070, Mar. 10, 1971, abandoned, and Ser. No. 219,892, Jan. 21, 1972, abandoned.

[30] Foreign Application Priority Data

Jul. 23, 1970 [JP] Japan .................................. 45-64814

[51] Int. Cl.$^3$ .......................................... C07D 493/10
[52] U.S. Cl. .................................................. 549/226
[58] Field of Search ........................................ 260/335

[56] References Cited

U.S. PATENT DOCUMENTS

| | | | |
|---|---|---|---|
| 3,669,711 | 6/1972 | Kimura et al. | 117/36.2 |
| 3,721,576 | 3/1973 | Farber et al. | 117/36.2 |
| 3,746,562 | 7/1973 | Lin | 117/36.2 |
| 3,873,573 | 3/1975 | Farber et al. | 260/335 |

FOREIGN PATENT DOCUMENTS

| | | | |
|---|---|---|---|
| 2110859 | 9/1971 | Fed. Rep. of Germany | 260/335 |
| 2130846 | 1/1972 | Fed. Rep. of Germany | 260/335 |
| 2242673 | 3/1973 | Fed. Rep. of Germany | 260/335 |
| 47-34442 | 11/1972 | Japan | 260/335 |

Primary Examiner—Norma S. Milestone
Attorney, Agent, or Firm—Armstrong, Nikaido, Marmelstein & Kubovcik

[57] ABSTRACT

The present invention discloses novel fluoran compound useful as the lactone electron donative color-forming agents having the general formula:

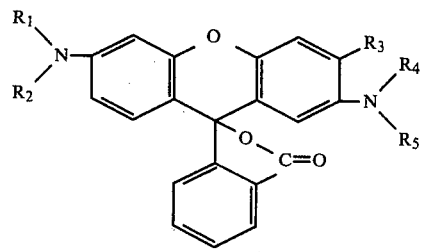

wherein, $R_1$, $R_2$ and $R_4$ are respectively hydrogen, methyl or ethyl groups; $R_3$ is hydrogen or a methyl group; and $R_5$ is a phenyl group or a phenyl group substituted with from one to five methyl groups. The compound of the invention is soluble in aromatic solvents as well as in aromatic-aliphatic mixed solvents and also has excellent light fastness after developing color.

1 Claim, No Drawings

RECORDING MATERIAL

This application is a continuation-in-part application of application Ser. No. 783,475 filed Mar. 31, 1977, which is a continuation-in-part of application Ser. No. 529,126 filed Dec. 3, 1974, which is a continuation-in-part application of application Ser. No. 295,580 filed Oct. 6, 1972, which is a continuation-in-part application of both application Ser. No. 123,070 filed Mar. 10, 1971 and application Ser. No. 219,892 filed Jan. 21, 1972, all now abandoned.

BACKGROUND OF THE INVENTION

The fluoran compounds represented by the above described general formula are synthetic compounds obtained by the present inventors, and although they themselves are usually faintly colored crystals they are characterized by that when their solutions dissolved in an organic solvent are brought in contact with an electron receptive color-developing agent (hereinafter abbreviated color-developing agent) such as active clay or phenolic-resin, the lactone ring in said compounds opens and immediately produces green, black, or greenish-black color. They are therefore very useful as electron donative color-forming agents (hereinafter abbreviated color-forming agents) for the manufacture of recording materials.

As is well known, recording materials utilizing color-forming agents include pressure-sensitive recording paper, heat-sensitive recording paper, electrothermal recording paper, hectograph transfer paper, and the like.

A number of compounds have been proposed as color-forming agents including various lactones, including crystal violet lactone and malachite green lactone. In addition, thiazine compounds such as benzoyl leucomethylene blue have been proposed, as well as leucoauramine and spiropyran compounds. Various problems have been associated with prior art color formers and, particularly in view of the increased importance of pressure sensitive copying papers in the business world, the search for improved color-forming agents has been widespread. Although the colors provided by the prior art color-forming agents have been generally satisfactory, a particular problem has arisen in that the copy papers often are unsuitable for permanent copies. This is particularly true for color-forming agents which produce greenish-black colors. A cause of this problem is the fact that prior art color formers do not provide colors which have a sufficient degree of fastness to the effects of light. In addition, color-forming agents have been found to be poorly soluble in certain important solvents.

As examples of prior art compound which have been the object of research reported in recent United States patents may be mentioned the work reported by Sullivan, U.S. Pat. Nos. 3,244,548; Kimura et al, 3,501,331; and Katayama et al, 3,514,311 Fluoran dyestuffs of a different series, being totally devoid of substituents other than hydrogen at the 5- and 6-positions, are reported as the object of research in German Offenlegungsschrift No. 2,024,859, opened Nov. 26, 1970.

Among the color-forming agents of the prior art, the lactones have generally been utilized, as they develop into a wide range of colors, from yellow and red to blue and green, at a high developing speed. Particularly with respect to color-forming agents which develop into a greenish-black, consideration is directed to the lactones, and more particularly to the fluoran compounds for several practical reasons. Greenish-black color formers have great significance with respect to the purpose for which pressure sensitive copying papers are employed. Most of the pressure sensitive copying papers now in use employ either crystal violet lactone or benzoyl leucomethylene blue as the principal color formers, both of which develop into blue; the resultant blue-copied image is not suitable for recopying by xerography or a diazo system. This problem can be solved by obtaining a black-copied image through (1) the employment of a black color former, or (2) the combined employment of two or more color formers to synthesize a black copied image. Fluoran compounds which develop into a greenish-black therefore are well-suited for such recopying purposes. A color-forming agents which develops into a black shade can achieve the purpose by itself and one which develops into green can produce a stabilized and satisfactory black copied image when mixed with another color former which develops into red.

Conventional greenish-black fluoran color-forming agents have not proven to be satisfactory in that they are poorly soluble in aromatic-aliphatic mixed solvents. Specifically, aromatic solvents such as diphenyl chloride have been commonly used for dissolving the color-forming agents for pressure sensitive copying paper. Recently, however, for economic and other reasons, aliphatic solvents such as high boiling petroleum fractions are admixed into the solvent, thus requiring that the color-forming agents have a solubility in such aromatic-aliphatic mixed solvents.

The fluoran compounds of the invention also can be easily synthesized by the process which comprises contacting an acylaminophenol of the formula

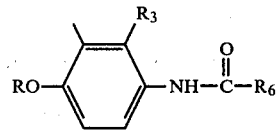

with a halophenyl compound of the formula

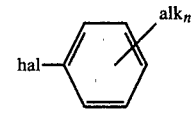

and deacylating the resultant intermediate to produce a diphenylamin of the formula

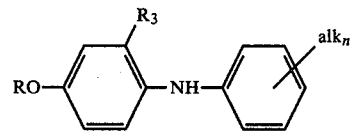

thereafter condensing said diphenylamine with o-[4-di(-lower alkyl) amino-2-hydroxybenzoyl] benzoic acid wherein R and $R_6$ are lower alkyl, hal is halogen, alk is alkyl, n is an integer of 1 to 5 and $R_1$, $R_2$, $R_3$ and $R_4$ are as defined above. In a preferred embodiment, hal is iodo or bromo.

SUMMARY OF THE INVENTION

In accordance with the invention, an excellent color-forming agent which dissolves well not only in aromatic solvents, but also in aromatic-aliphatic mixed solvents and has excellent light resistance is provided.

The color-forming agent of this invention is expressed by the following general formula:

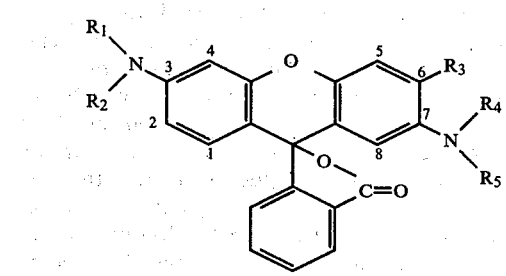

In the formula, $R_1$ and $R_2$ and $R_4$ are respectively hydrogen, methyl or ethyl, $R_3$ is hydrogen or methyl, and $R_5$ is phenyl or phenyl substituted with from one to five methyl groups.

We have found that if $R_4$ is hydrogen or a lower alkyl group and if at least one methyl group is positioned on the phenyl group $R_5$ or is present as the radical $R_3$, the resulting fluoran has good solubility in the aromatic-aliphatic mixed solvent. We have also found that the fluoran compound, 3-diethylamino-6-methyl-7-(2',4'-dimethylanilino)fluoran, in accordance with the invention is particularly superior in solubility in aromatic and aromatic-aliphatic mixed solvents.

DETAILED DESCRIPTION

The following are typical examples of the novel color-forming agents.

EXAMPLE 1

3-diethylamino-7-N-methyl (4',6'-xylidyl)fluoran (I)

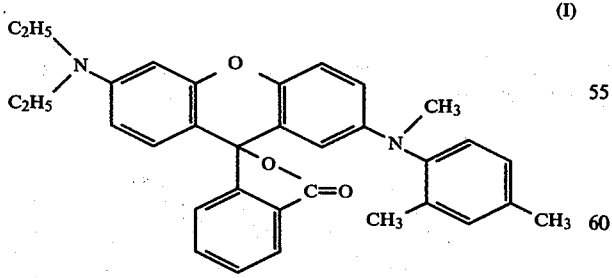

This compound (I) is a slightly pinkish white crystal having a melting point of 109° to 110° C. obtained by condensing o-(4-diethyl-amino-2-hydroxybenzoyl)benzoic acid (II)

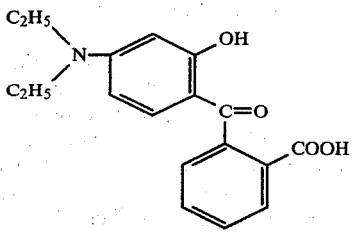

and p-N-methyl(4,6-xylidino)anisole in concentrated sulfuric acid and develops into green by the action of solid acid. It has such an excellent solubility in organic solvents that it dissolves very well in the aromatic-aliphatic mixed solvent. For example, at ordinary temperatures it dissolves into a 2:1 mixed solvent of diphenyl chloride and high boiling petroleum fractions (with a boiling point above 200° C.) up to 6 percent by weight or more based on the total solution, such a degree of solubility being very advantageous for the manufacture of pressure sensitive copying paper. In addition, it is excellent in light resistance after the development of color.

EXAMPLE 2

3-diethylamino-7-N-methyl-o-toluidinofluoran (III)

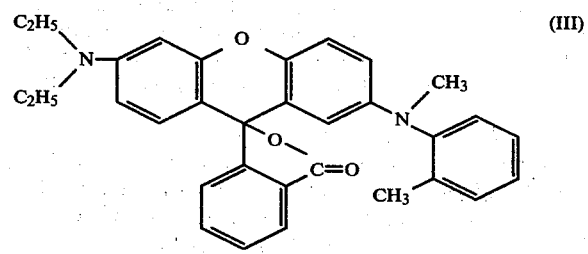

This compound is a white crystal having a melting point of 177° to 178° C. obtained by condensing o-(4-diethylamino-2-hydroxybenzoyl)benzoic acid (II) and p-N-methyl-o-toluidinoanisole in concentrated sulfuric acid and develops into green by the action of acid clay or phenolic derivatives. It dissolves well in the aromatic-aliphatic mixed solvent and has an excellent light resistance after the development of color.

EXAMPLE 3

3-diethylamino-7-N-methyl-p-toluidinofluoran (IV)

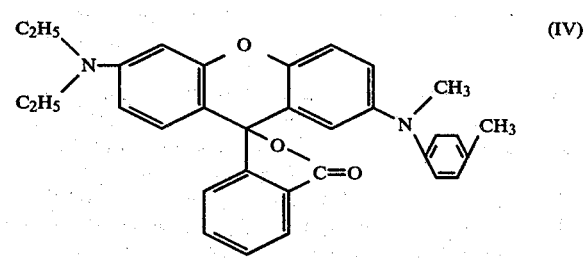

This compound is a white crystal having a melting point of 171° to 172° C. obtained by condensing o-(4-diethylamino-2-hydroxybenzoyl)benzoic acid (II) and p-N-methyl-p-toluidinoanisole in concentrated sulfuric acid and develops into green by the action of solid acid. It dissolves well in the aromatic-aliphatic mixed solvent and has an excellent light resistance after the development of color.

EXAMPLE 4

3-diethylamino-6-methyl-7-p-toluidinofluoran (V)

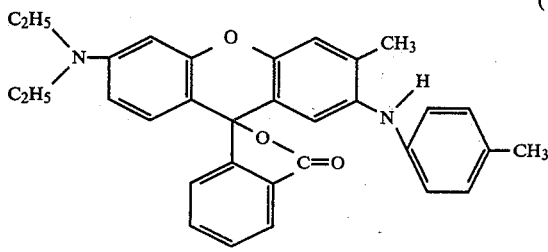

This compound is a white crystal having a melting point of 170° to 171° C. obtained by condensing o-(4-diethylamino-2-hydroxybenzoyl)benzoic acid (II) and 3-methyl-p-toluidinoanisole in concentrated sulfuric acid and develops into black by the action of solid acid. It dissolves well in the aromatic-aliphatic mixed solvent and has an excellent light resistance after the development of color.

EXAMPLE 5

3-diethylamino-6-methyl-7-anilinofluoran

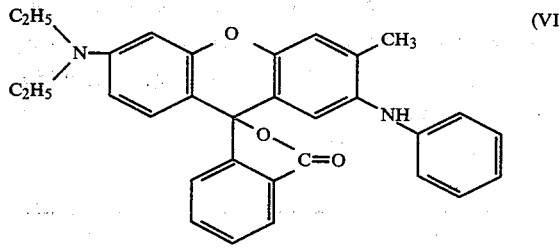

24 g. of 3-methoxy-6-acetylaminotoluene, 31.6 g. of bromobenzene, 10.38 g. of potassium carbonate, 0.6 g. of copper powder and 0.01 g. of iodine were refluxed under ordinary pressure on the oil bath for 48 hours. Then excess bromobenzene was recovered by means of steam distillation, and the reamining reaction mixture was distilled in a vacuum to obtain 29.2 g. (85.0 percent of theoretical yields) of 3-methoxy-6-(N-acetylanilino)toluene as a light yellowish brown solid having a melting point at 86° to 87° C., having the formula:

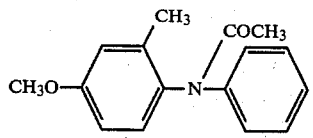

25 g. of this intermediate was hydrolyzed by heating at 180° C. for 8 hours in the autoclave, together with 130 ml. of water and 9 g. of caustic soda. After cooling, the reaction product was filtered to collect a solid and thereafter recrystallized by using a double amount of ethyl alcohol. 18.8 g. (90.5 percent of theoretical yields) of 3-methoxy-6-anilinotoluene was obtained as light brown crystals having a melting point of 79° to 80.5° C.

10 g. of this 3-methoxy-6-anilinotoluene and 14.7 g. of ortho-(4-diethylamino-2-hydroxybenzoyl)benzoic acid were mixed in 50 ml. of concentrated sulfuric acid and stirred for 42 hours at 25° C. Then the mixture was poured into 500 ml. of water and the precipitate was filtered off, washed with 300 ml. of a 2 percent aqueous solution of caustic soda at 60° C. dried and recrystallized from 220 ml. of toluene. 14.2 g. (63.5 percent of theoretical yields) of 3-diethylamino-6-methyl-7-anilinofluoran was obtained as light yellow crystals having a melting point of 201° to 201.5° C.

| | Analysis | | |
|---|---|---|---|
| | C | H | N |
| Theoretical value | 78.15% | 5.88% | 5.88% |
| Observed value | 78.14% | 5.68% | 5.65% |

EXAMPLE 6

3-diethylamino-6-methyl-7-(2',4'-dimethylanilino)fluoran

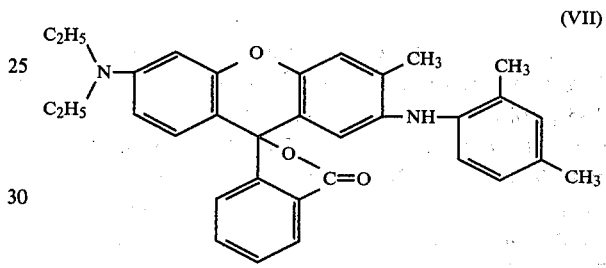

80 g. of 3-methoxy-6-acetylaminotoluene of Example 5. 160 g. of 4-bromomethaxylene, 35 g. of potassium carbonate, 2 g. of copper powder and 0.2 g. of iodine were refluxed under ordinary pressure for 48 hours on the oil bath. Then excess 4-bromomethaxylene was recovered by means of steam distillation, and the remaining solid [crude 3-methoxy-6-(N-acetyl-2',4'-dimethylanilino)toluene] was filtered off, mixed, without purifying with 300 ml. of a 10 percent aqueous solution of caustic soda and heated in the autoclave to 200° C. for 8 hours. After cooling an oil layer was separated from it and purified by means of distillation in a vacuum. Then 22.8 g. (78.7 percent of theoretical yield) of 3-methoxy-6-(2',4'-dimethylanilino)toluene was obtained as light yellow crystals having a melting point of 78° to 79° C., having the formula:

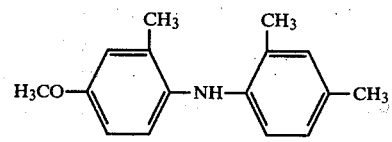

10 g. of the thus obtained intermediate and 13 g. of ortho-(4-diethylamino-2-hydroxybenzoyl)benzoic acid were stirred in 92 g. of concentrated sulfuric acid for 42 hours at ordinary temperature. The resultant was treated in the same way as Example 2, and 15.2 g. (72.7 percent of theoretical yields) of 3-diethylamino-6-methyl-7-(2',4'-dimethylanilino)fluoran was obtained as light yellow crystals having a melting point of 158° to 160° C. Results of Analysis:

|                   | C      | H     | N     |
|-------------------|--------|-------|-------|
| Theoretical value | 78.7%  | 6.35% | 9.53% |
| Observed value    | 78.1%  | 6.29% | 9.42% |

EXAMPLE 7

3-diethylamino-6-ethyl-7-anilinofluoran

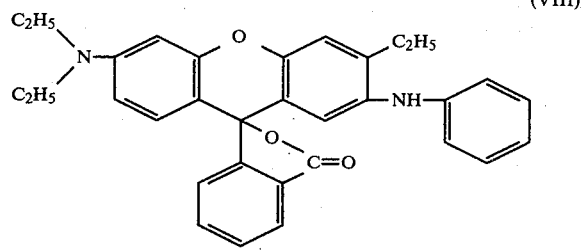
(VIII)

19.3 g. of 3-methoxy-6-acetylamino-1-ethylbenzene, 22 g. of bromobenzene, 7.78 g. of potassium carbonate, 0.43 g. of copper powder and 0.01 g. of iodine were refluxed under ordinary pressure for 48 hours on the oil bath. Then excess bromobenzene was recovered by means of steam distillation, and the remaining solid [crude 3-methoxy-6(N-acetylanilino)ethylbenzene] was filtered off, mixed, without purifying, with 140 ml. of a 10 percent aqueous solution of caustic soda and heated in the autoclave to 200° C. for 8 hours. After cooling, an oil layer was separated from it and purified by means of distillation under reduced pressure. Then 14.8 g. (66.0 percent of theoretical) of 3-methoxy-6-anilinoethylbenzene was obtained as a light yellow oily substance having a boiling point of 185° to 215° C./13 mmHg, and the formula:

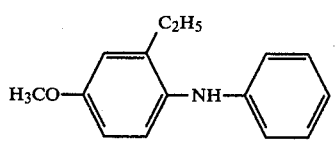

10 g. of the thus obtained intermediate and 16.8 g. of ortho-(4-diethylamino-2-hydroxybenzoyl)benzoic acid were stirred in 50 ml. of concentrated sulfuric acid for 48 hours at ordinary temperature. The resultant product was treated in the same manner and 12 g. (55.2 percent of theoretical) of 3-diethylamino-6-ethyl-7-anilinofluoran was obtained as light red crystals having a melting point of 103° to 105° C.
Results of Analysis:

|                   | C     | H     | N     |
|-------------------|-------|-------|-------|
| Theoretical value | 78.4% | 6.13% | 5.72% |
| Observed value    | 78.2% | 6.01% | 5.61% |

EXAMPLE 8

3-diethylamino-6-methyl-7-(2',4',5'-trimethylanilino)-fluoran

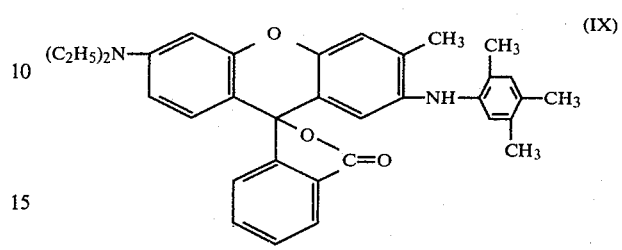
(IX)

30 g. of 3-methoxy-6-acetylaminotoluene, 40 g. of 2,4,5-trimethylbromobenzene, 15 g. of potassium carbonate, 1 g. of copper powder and 0.1 g. of iodine were reacted for 75 hours at 220° to 230° C. Then 15 g. of potassium hydroxide and 30 ml. of iso-propylalcohol were added and refluxed for 24 hours. The resultant was poured into 200 ml. of water and precipitate was filtered off, distilled in a vacuum to obtain 35.5 g. (83 percent of theoretical yields) of 4-methoxy-2,2',4',5'-tetramethyldiphenylamine as a light brown crystal having a melting point of 87° to 88° C., and boiling point of 165° to 168° C./3 mmHg.

The result of analysis $C_{17}H_{21}NO$:

|                   | C      | H     | N     |
|-------------------|--------|-------|-------|
| Theoretical value | 79.94% | 8.30% | 5.49% |
| Observed value    | 79.76% | 8.26% | 5.51% |

17 g. of the above intermediate, 21 g. of o-(4-diethylamino-2-hydroxybenzoyl)benzoic acid were mixed in 60 ml. of concentrated sulfuric acid and stirred for 40 hours at room temperature. Then the mixture was poured into 500 ml. of water and the precipitate was filtered off, washed with aqueous solution of caustic soda, and recrystallized from 300 ml. of toluene. 25 g. (71.7 percent of theoretical yields) of 3-diethylamino-6-methyl-7-(2',4',5'-trimethylanilino)fluoran was obtained as brown crystalins having a melting point of 187° to 188° C., which develops black color on contacting with solid acid.

Result of analysis: $C_{34}H_{34}N_2O_3$:

|                   | C      | H     | N     |
|-------------------|--------|-------|-------|
| Theoretical value | 78.72% | 6.62% | 5.41% |
| Observed value    | 78.54% | 6.51% | 5.50% |

EXAMPLE 9

3-diethylamino-6-methyl-7-(2',3',5',6'-tetramethylanilino)fluoran

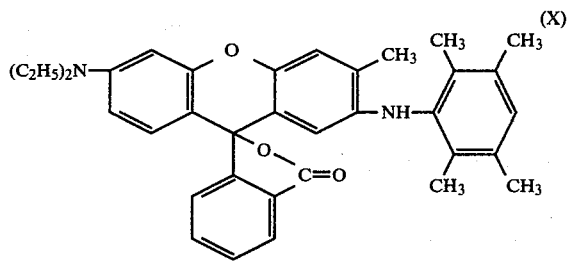

30 g. of 3-methoxy-6-acethylaminotoluene, 50 g. of 2,3,5,6-tetramethylbromobenzene, 15 g. of potassium carbonate, 1 g. of copper powder and 0.1 g. of iodine were reacted 100 hours at 230°–240° C. Then 20 g. of potassium hydroxide and 40 ml. of ethylalcohol were added and refluxed for 30 hours. The resultant was poured into 200 ml. of water and precipitate was filtered off, distilled in a vacuum to obtain 34.4 g. (76.5 percent of theoretical yields) of 4-methoxy-2,2',3',5',6'-pentamethyldiphenylamine as a light yellow crystal having boiling point of 174° to 175° C./2 mmHg, and melting point of 120° to 121° C.

The result of analysis: $C_{18}H_{23}NO$:

|  | C | H | N |
|---|---|---|---|
| Theoretical value | 80.24% | 8.62% | 5.20% |
| Observed value | 80.11% | 8.24% | 5.26% |

12 g. of the above intermediate, 14 g. of o-(4-diethylamino-2-hydroxybenzoyl)benzoic acid were mixed in 50 ml. of concentrated sulfuric acid and stirred for 40 hours at room temperature. Then the mixture was poured into 500 ml. of water and the precipitate was filtered off, washed with aqueous solution of caustic soda, and recrystallized from 200 ml. of toluene. 14.5 g. (61 percent of theoretical yields) of 3-diethylamino-6-methyl-7-(2',3',5',6'-tetramethylanilino)fluoran was obtained as light brown powder having a melting point of 177° to 179° C., which develops black color on contacting with solid acid.

Result of analysis: $C_{35}H_{36}N_2O_3$:

|  | C | H | N |
|---|---|---|---|
| Theoretical value | 78.90% | 6.83% | 5.26% |
| Observed value | 79.02% | 6.90% | 5.21% |

EXAMPLE 10

3-diethylamino-6-methyl-7-(pentamethylanilino)fluoran

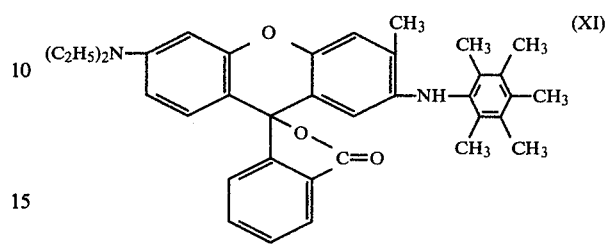

30 g. of 3-methoxy-6-acetylaminotoluene, 50 g. of pentamethyl bromobenzene, 15 g. of potassium carbonate, 1 g. of copper powder and 0.1 g. of iodine were reacted for 150 hours at 240° to 250° C. Then 20 g. of potassium hydroxide and 30 ml. of iso-propylalcohol were added and refluxed for 40 hours. The resultant was poured into 200 ml. of water, extracted with 100 ml. of toluene, and distilled in a vacuum to obtain 31 g. (65.3 percent of theoretical yields) of 4-methoxy-2,2',3',4',5',6'-hexamethyldiphenylamine as a light yellow crystal having a melting point of 190° to 200° C./5 mmHg, and melting point of 128° to 130° C.

The result of analysis: $C_{19}H_{25}NO$:

|  | C | H | N |
|---|---|---|---|
| Theoretical value | 80.50% | 8.91% | 4.94% |
| Observed value | 80.16% | 8.66% | 5.03% |

12 g. of the above intermediate, 14 g. of o-(4-diethylamino-2-hydroxybenzoyl)benzoic acid were mixed in 50 ml. of concentrated sulfuric acid and stirred for 40 hours at room temperature. Then the mixture was poured into 500 ml. of water and the precipitate was filtered off, washed with aqueous solution of caustic soda, and recrystallized from 200 ml. of toluene. 9 g. (38.8 percent of theoretical yields) of 3-diethylamino-6-methyl-7-(pentamethylanilino)fluoran was obtained as brown powder having a melting point of 135° to 137° C., which develops black color on contacting with solid acid.

The result of analysis: $C_{36}H_{38}N_2O_3$:

|  | C | H | N |
|---|---|---|---|
| Theoretical value | 79.08% | 7.02% | 5.12% |
| Observed value | 78.46% | 6.91% | 5.02% |

EXAMPLE 11

3-diethylamino-6-methyl-7-(4-butylanilino)fluoran

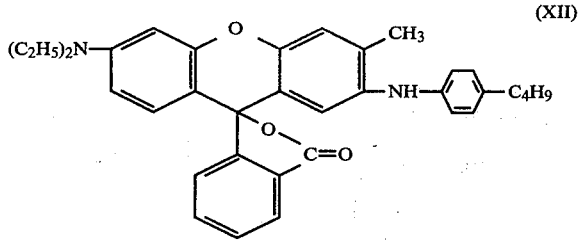
(XII)

20 g. of 3-methoxy-6-acetylaminotoluene, 30 g. of 4-butyl bromobenzene, 10 g. of potassium carbonate, 0.5 g. of copper powder and 0.1 g. of iodine were reacted for 40 hours at 210° to 220° C. Then 10 g. of potassium hydroxide and 40 ml. of ethylalcohol were added and refluxed for 24 hours. The resultant was poured into 200 ml. of water, extracted with 100 ml. of toluene, and distilled in a vacuum to obtain 21.5 g. (71.5% of theoretical yields) of 4-methoxy-butyldiphenylamine as light yellow oil having a boiling point of 175° to 176° C./2 mm Hg.

Result of analysis: $C_{18}H_{23}NO$:

|  | C | H | O |
|---|---|---|---|
| Theoretical value | 80.24% | 8.62% | 5.20% |
| Observed value | 80.18% | 8.55% | 5.10% |

10 g. of the above intermediate, 11.6 g. of o-(4-diethylamino-2-hydroxybenzoyl)benzoic acid were mixed in 35 ml. of concentrated sulfuric acid and stirred for 40 hours at room temperature. Then the mixture was poured into 300 ml. of water and the precipitate was filtered off, washed with aqueous solution of caustic soda, and recrystallized from 100 ml. of toluene. 16.2 g. (81.9 percent of theoretical yields) of 3-diethylamino-6-methyl-7-(4-butylanilino)fluoran was obtained as white powder having a melting point of 168° to 169° C., which develops greenish black color on contacting with solid acid.

The result of analysis: $C_{35}H_{36}N_2O_3$:

|  | C | H | O |
|---|---|---|---|
| Theoretical value | 78.90% | 6.83% | 5.26% |
| Observed value | 78.54% | 6.69% | 5.24% |

EXAMPLE 12

4 g. of 3-diethylamino-6-methyl-7-p-toluidinofluoran (V) was dissolved in a mixed solvent of 100 g. of diphenyl chloride and 50 g. of high boiling petroleum fractions (with a boiling point of above 200° C.). The mixture was added to the aqueous solution of gelatin and gum arabic, and the final mixture was completely dispersed and emulsified with a homo-mixer. Then water at 50° C. was added until the total volume of the solution became 2,000 ml. Thereafter 90 ml. of 10% acetic acid was added, and water at 50° C. was added while stirring; the total weight became 4 Kg. The solution was stirred for an hour, cooled to below 10° C. with further stirring, admixed with 10% caustic soda solution until a pH of 9 was obtained, and then gradually returned to room temperature. The solution thus obtained was applied on the lower surface of the upper leaf of pressure sensitive paper and dried.

Separately, solid acid, such as acid clay and phenolic compounds, was applied on the upper surface of the lower leaf.

When the thus prepared upper and lower leaves were used for copying, they readily produced a black copied image which had excellent light resistance.

EXAMPLE 13

To demonstrate the solubility of the fluoran compounds of the invention in an aromatic solvent, various quantities of the fluoran compounds (A)-(E) identified in Table 1 below were added to 10 g. of the solvent, Hysol N-295 and complete dissolution was effected at 90° C. with occasional stirring. Hysol N-295 is an organic solvent sold by Japan Petrochemical Ind. Co., Ltd. and is a diarylethane, composed mainly of diphenylethane. It is preferred aromatic solvent for use in the field of pressure-sensitive copying paper.

Each solution was allowed to stand for a period of time at room temperature to determine whether deposition of the fluoran compound occurred or not. The results are summarized in Table 1.

TABLE 1

(A)  3-dimethylamino-6-methyl-7-(2',4'-dimethylanilino)fluoran (Refer to Example 6)

No deposition occurred when 0.8 g was dissolved and was allowed to stand at room temperature for ten days.

(B) 3-diethylamino-6-methyl-7-anilinofluoran (Refer to Example 5)

Slight deposition occurred when 0.3 g was dissolved and was allowed to stand at room temperature for seven days.

Slight deposition occurred when 0.4 g was dissolved and was allowed to stand at room temperature for one day.

(C) 3-diethylamino-7-(2'-4'-dimethylanilino)fluoran

Slight deposition occurred when 0.3 g was dissolved and was allowed to stand at room temperature for seven days.

Slight deposition occurred when 0.4 g was dissolved and was allowed to stand at room temperature for one day.

(D) 3-diethylamino-6-methyl-7-(2',5'-dimethylanilino)-fluoran

Slight deposition occurred when 0.5 g was dissolved, and allowed to stand at room temperature for one day.

(E) 3-diethylamino-6-methyl-7-(3',4'-dimethylanilino)-fluoran

Slight deposition occurred when 0.5 g was dissolved, and allowed to stand at room temperature for one day.

It may be seen from the above results that although all of the fluoran compounds (B)-(E) show relatively low solubility in the aromatic solvent, whereas the compound (A) has particularly superior solubility in the solvent, being at least about twice as soluble as each of the other compounds.

What is claimed is:

1. 3-diethylamino-6-methyl-7-(2',4'-dimethylanilino)-fluoran.

* * * * *

UNITED STATES PATENT AND TRADEMARK OFFICE
CERTIFICATE OF CORRECTION

PATENT NO. : 4,330,473
DATED : May 18, 1982
INVENTOR(S) : HATANO ET AL

It is certified that error appears in the above-identified patent and that said Letters Patent are hereby corrected as shown below:

Column 5, line 46, "reamining" should read --remaining--.

Column 6, line 64: "Example 2" should read --Example 5--.

Column 7, in the table at the top of the column, the theoretical value for "N" should read --5.55 %-- and the observed value for "N" should read --5.42%--.

Signed and Sealed this

First Day of February 1983

|SEAL|

Attest:

GERALD J. MOSSINGHOFF

Attesting Officer     Commissioner of Patents and Trademarks